United States Patent [19]

Terry

[11] 3,986,725
[45] Oct. 19, 1976

[54] MANUALLY PROPELLED VEHICLE

[76] Inventor: Burton Alexander Terry, 7 Peru Court, Mount Waverley, Victoria, Australia, 3149

[22] Filed: May 13, 1975

[21] Appl. No.: 577,117

[52] U.S. Cl. .............................. 280/240; 280/95 R; 280/247; 280/269
[51] Int. Cl.² ......................................... B62K 21/00
[58] Field of Search .................. 280/240, 269, 95 R, 280/247

[56] References Cited
UNITED STATES PATENTS

| 232,620 | 9/1880 | Trautmann | 280/240 X |
| 1,387,281 | 8/1921 | McCarthy | 280/240 |
| 1,845,044 | 2/1932 | Curry | 280/269 |
| 2,484,954 | 10/1949 | Marasco | 280/240 |
| 2,884,259 | 4/1959 | Snodgrass | 280/95 R X |
| 2,892,638 | 6/1959 | Stadden | 280/240 X |
| 2,928,682 | 3/1960 | Spencer | 280/267 X |
| 3,336,047 | 8/1967 | Burgess | 280/240 |

FOREIGN PATENTS OR APPLICATIONS

| 16,649 | 7/1929 | Australia | |
| 104,091 | 6/1938 | Australia | |
| 1,208 | 3/1927 | Australia | |
| 547,285 | 12/1922 | France | 280/240 |

Primary Examiner—M. H. Wood, Jr.
Assistant Examiner—John P. Silverstrim
Attorney, Agent, or Firm—Finnegan, Henderson, Farabow & Garrett

[57] ABSTRACT

A manually propelled vehicle having a main frame supported on front and rear ground engageable wheels, a support body on the frame for supporting an occupant, control means operable by the occupant and comprising an oscillating drive member mounted to pivot about an axis transverse of the vehicle, a connecting rod interconnecting the drive member to a crank mechanism formed in a support axle for the rear wheels. A handle is pivotally connected to the drive member, with a pair of bowden cables interconnecting the handle with steering linkage systems cooperating with the axles of the front wheels. The bowden cables pass through the pivot axis of the drive member. The arrangement being such that oscillation of the drive member will cause the rear wheels to be driven by the connecting rod and crank mechanism, while pivoting movement of the handle due to downward pressure applied to one side or other of the handle will facilitate steering of the front wheels via the bowden cables and steering linkage systems.

2 Claims, 4 Drawing Figures

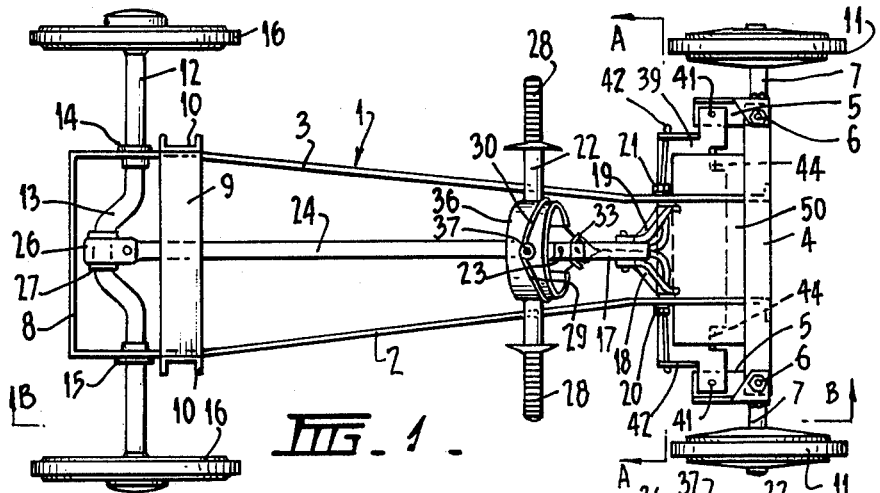

MANUALLY PROPELLED VEHICLE

This invention relates to a manually propelled vehicle, that is, a vehicle of the type where the person being conveyed rides on the vehicle and manually operates means to both propel and steer the vehicle.

The invention more particularly relates to a manually propelled vehicle wherein the means to propel and steer the vehicle are combined to be operable through a single control member.

The invention is particularly suitable for use by handicapped persons afflicted completely, or partially, with paralysis or incapacity of the abdomen and/or legs, or complete or partial loss of the lower limbs, but whose upper portion of the body, particularly, the arms, shoulders and hands, are capable of functioning effectively.

Alternatively in a modification of the invention I may provide a vehicle which is suitable for use by persons whose handicap is such that the upper limbs cannot function normally, or may be non-existent, but where lower parts of the body including the hips, legs and feet function effectively.

In the case of handicapped persons where the upper limbs only can be used, the inventive vehicle may be propelled and steered by at least one arm, whilst in the case where the lower limbs only can be used, the vehicle may be propelled and steered by at least one leg.

Although the inventive vehicle is suitable for providing mobility for persons of all ages, it is particularly satisfactory for use by children, due to its relative simplicity of operation, and the relatively small operating forces required to be exerted to propel and steer the vehicle.

One particular handicap prominent amongst children in Spinal Bifida arising due to a malformation of the spinal cord which causes some degree of paralysis, particularly in the area of the abdomen and legs. The severity of this handicap varies considerably from child to child, and in severe cases requires the use of callipers and crutches. However, due to advances in medical techniques the majority of children born with Spinal Bifida survive, and in many cases surgery can strengthen limbs and rectify deformations to an extent whereby the child can learn to walk.

In the meantime the vehicle of the invention can provide such children with some form of mobility.

It is therefore a principal object of the present invention to provide a manually propelled vehicle wherein either one or both of the upper limbs only, or one or both of the lower limbs only, can be used to propel and steer the vehicle.

This principal object of the invention is achieved by providing a vehcile having a single control member which combines both to propel and to steer the vehicle.

The invention therefore envisages a manually propelled vehicle comprising a main frame supported on ground engageable wheels or track members, means mounted on said main frame for supporting one or more occupants, and a control means operable, in use, by at least one occupant and adapted to incorporate both means to drive at least one of said wheels or track members and means to cooperate with at least one of said wheels or track members to steer said vehicle.

Preferably the means to drive at least one of said wheels or track means is an oscillating drive member mounted to pivot about an axis transverse of the vehicle, and a connecting rod interconnecting said drive member to a crank mechanism connected to or integral with, and rotatable about an axis co-axial to, support axles for a pair of rear support wheels, with a handle fixed integral with, or connected to, said drive member and extending transversely of said vehicle and positioned within reach of the occupant, whereby upon oscillation of said drive member by at least one hand or leg the rear support wheels will be driven via said connecting rod and said crank mechanism.

Preferably said handle is pivotally connected to said drive member and a pair of wheels or track means are provided at the front of said vehicle and supported on front axles extending transversely of the vehicle and pivotable about substantially vertical axes, and wherein the means to steer said vehicle are a pair of bowden cables the first of which connects part of the handle on one side of the vehicle with a steering linkage system cooperating with the front support axle on one side of the vehicle and the second of which connects the opposite side of the handle to a steering linkage system cooperating with the front support axle on the other side of the vehicle, whilst each bowden cable passes through a point substantially coincident with the pivot axis of the drive member.

Preferably each bowden cable interconnects the part of the handle on one side of the vehicle with steering linkage system for the axle on the opposite side of the vehicle, whereby pivoting movement of the handle due to downward pressure applied to one side of the handle causes the vehicle to be steered towards the same side as that to which downward pressure was applied to the handle.

One preferred form of the invention will now be described with reference to the accompanying drawings in which:

FIG. 1, is a plan view of the basic structural components of a vehicle according to this preferred form of the present invention;

FIG. 2, is a front view taken along line A—A of FIG. 1,

FIG. 3, is a side view taken along line B—B of FIG. 1, and

FIG. 4, is a general perspective view of the vehicle of FIGS. 1 to 3 showing in particular a vehicle including a fibreglass body section for receiving and supporting the occupant.

Referring to FIGS. 1, 2 and 3 in particular the vehicle comprises a main frame generally indicated as 1, consisting of two rearwardly diverging side frame members 2 and 3 the front ends of which are interconnected by a transverse member 4 which carries at either end a pair of front wheel axle support members 5 pivotally connected thereto about pivot bolts 6 each carrying a front wheel axle 7. The rear ends of the frame members 2 and 3 are interconnected by a transverse member 8, and the intermediate portions of which are interconnected by a transverse member 9 bridging upstanding support members 10 connected to the respective frame members 2 and 3.

The front axles 7 in being carried by the axle support member 5 which are pivotally connected to the transverse member 4 are therefore allowed to pivot about the substantially vertical axes provided by the pivot bolts 6. Front support wheels 11 are provided on the front axles 7. A rear axle 12, including a crank portion 13, extends transversely of the rear of the main frame 1, through bearing supports 14 and 15 retained within the side frame members 2 and 3 respectively. The ends of the rear support axle 12 are provided with rear support wheels 16.

Positioned toward the forward end of the main frame 1 is a tubular drive member 17 one end of which is supported between the closest ends of a pair of upwardly converging support members 18 and 19, the separated ends of which are pivotally supported on the side frame members 2 and 3 via tubular sleeve members 20 and 21.

Adjacent the upper end of the tubular member 17 a handle 22 is pivotally connected by a nut and bolt arrangement 23 to extend transversely of the vehicle, with the pivot axis being generally transverse of the length of the tubular drive member 17.

A connecting rod 24 interconnects the crank section 13 of the rear axle 12 to the tubular drive member 17 at a point a short distance from its lower end via pivotal connections 25 and 26. Preferably a sheet of Teflon is incorporated at the pivotal connection 26 to form a bearing 27 at the connection.

Oscillating motion of the tubular drive member 17 forwardly and rearwardly of the vehicle will, via the connecting rod 24 and crank section 13 cause rotation of the rear axle 12 and thus drives the vehicle by means of the rear wheels 16. At each end of the handle 22 hand grips 28 are provided for grasping by the operating occupant.

In order to steer the vehicle a pair of interconnected bowden cable sections 29 and 30 are utilized the outer sleeves 31 and 32 of which are held relatively stationary against longitudinal axial movement and the inner cores 34 and 35 of which are slidably received within the sleeves 31 and 32 respectively. The ends of the outer sleeves 31 and 32 terminate and are therefore held against axial movement by retaining clips 33 adjacent the upper end of the drive member 17 and the tubular sleeve members 21 and 20 respectively at the side frame members 3 and 2.

One end of the inner core 34 of the bowden cable 29 is received around, and fixed to, a steering drum 36, at 37, and it together with its outer sleeve 31 extends through a hole 38 into, and down through, the interior of the tubular member 17, and then outwardly through the lower end thereof through the tubular sleeve member 21 to where it is attached to a steering linkage plate 39 to be later described.

The bowden cable 30 is likewise positioned in the reverse direction across the vehicle from connection 37, hole 43 tubular member 17, to a position attached to the opposite end of the steering linkage plate 39,. The steering drum 36 includes a cut-away portion 40 to prevent it fouling the drive member 17.

The steering linkage plate 39 extends transversely of the vehicle and connected at either end to the respective axle support members 5 at opposite sides of front end of the vehicle via pivot pins 41. Portions of the ends of the plate 39 are cut and bent upwardly to form flanges 42 which receive and retain the ends of the bowden cables 29 and 30. At two spaced positions along the front edge of the plate 39 cuts are made and upturned flaps 44 formed, which limit the amount of movement of the plate 39 laterally of the vehicle, the limits being set by the point at which the respective flap 44 meets the adjacent side frame member 2 and 3.

Referring particularly to FIG. 4, connected to the main frame 1, either by bolted connections or glueing is a glass fiber body portion 45 providing a self-centering shaped seat portion 46 with a back 47 high enough to offer support and wide enough to allow for a range of sizes of occupants together with leg receiving portions 48 and 49 for supporting the legs of the occupant.

The fibreglass body portion 45 is connected to the main frame at a front support structure 50 and the rear transverse member 9. A slot 51 in the body portion 45 allows the tubular drive member 17 to pass therethrough.

It will be observed that depression of the handle 22 in one direction will cause the front wheel on the opposite side of the vehicle to be turned inwardly, and cause the front wheel on the same side to be turned outwardly by means of the bowden cables 29 and 30 and the axle supporting member 5 interconnected by steering linkage plate 39, thus effecting steering of the vehicle.

The preferred described embodiment is suitable for use by persons whose lower limbs are not functional, but whose upper limbs, that is the shoulders, arms, and hands, are functional or effective to oscillate the tubular drive member 17 and allowing steering via the depressable handle 22.

In another form of the invention (not shown) for use in cases where the lower limbs are functional but upper limbs are not, the fibreglass body portion 45 may be so shaped as to allow the occupant to lie flat on the vehicle and to operate the drive and steering mechanism with his legs and feet.

The majority of the structural components are produced from metallic materials, for example steel, the wheels are rubber tyred and as previously stated the body portion is preferably made from fibreglass.

I claim:

1. A manually propelled vehicle comprising a main frame supported on a pair of front and a pair of rear wheels, means mounted on said main frame for supporting at least one occupant, an oscillating drive member operable by said at least one occupant and mounted to pivot about an axis extending transversely of the vehicle, a connecting rod interconnecting said drive member to a crank mechanism forming part of a support axle for the rear wheels, whereby upon oscillation of said drive member, the rear wheels will be driven by said connecting rod and said crank mechanism, a handle pivotally connected to said drive member, relatively non-stretchable cable means including a first portion directly connecting said handle to a portion of a steering mechanism cooperating with one of said front wheels on one side of the vehicle, said cable means including a second portion directly connecting said handle to a portion of the steering mechanism cooperating with the other of said front wheels, each said cable portions extending laterally of said drive member along a ling substantially coincident with the pivot axis of the drive member.

2. A manually propelled vehicle as claimed in claim 1, wherein said cable portions each include a bowden cable interconnecting the part of the handle on one side of the vehicle with a portion of the steering mechanism cooperating with the front ground engageable support means on the opposite side of the vehicle, said handle being pivotable about an axis transverse to said drive member and extending to either side thereof, whereby pivoting movement of the handle due to downward pressure applied to one side of the handle causes the vehicle to be steered towards the same side as that to which downward pressure was applied.

* * * * *